US011341782B2

(12) United States Patent
Makino

(10) Patent No.: US 11,341,782 B2
(45) Date of Patent: May 24, 2022

(54) INFORMATION PROCESSING APPARATUS, INFORMATION PROCESSING METHOD AND PROGRAM

(71) Applicant: MICWARE CO., LTD., Kobe (JP)

(72) Inventor: Hiroyuki Makino, Kobe (JP)

(73) Assignee: MICWARE CO., LTD., Kobe (JP)

( * ) Notice: Subject to any disclaimer, the term of this patent is extended or adjusted under 35 U.S.C. 154(b) by 179 days.

(21) Appl. No.: 16/782,843

(22) Filed: Feb. 5, 2020

(65) Prior Publication Data

US 2020/0250900 A1 Aug. 6, 2020

(30) Foreign Application Priority Data

Feb. 6, 2019 (JP) ............................. JP2019-020101

(51) Int. Cl.
*G07C 5/00* (2006.01)
*G07C 5/08* (2006.01)
*H04W 4/02* (2018.01)
*G08G 1/127* (2006.01)
*H04W 4/40* (2018.01)
*G01C 21/30* (2006.01)

(52) U.S. Cl.
CPC ............ *G07C 5/008* (2013.01); *G01C 21/30* (2013.01); *G07C 5/0841* (2013.01); *G08G 1/127* (2013.01); *H04W 4/027* (2013.01); *H04W 4/40* (2018.02)

(58) Field of Classification Search
CPC ....... G07C 5/008; G07C 5/0841; H04W 4/40; H04W 4/027; G01C 21/30; G08G 1/127
See application file for complete search history.

(56) References Cited

U.S. PATENT DOCUMENTS

| 6,718,235 | B1 * | 4/2004 | Borugian ............... | B62D 53/10 |
| | | | | 701/1 |
| 10,984,060 | B2 * | 4/2021 | AuYoung ................ | G06F 16/29 |
| 11,144,869 | B2 * | 10/2021 | Byron ..................... | H04W 4/35 |
| 2010/0063729 | A1 | 3/2010 | Goto | |
| 2010/0274816 | A1 * | 10/2010 | Guzik ................. | H04N 21/2743 |
| | | | | 707/802 |
| 2011/0130906 | A1 * | 6/2011 | Mayer ................... | B60L 3/0023 |
| | | | | 701/22 |
| 2017/0046230 | A1 * | 2/2017 | Guzik ................ | H04N 5/23206 |
| 2017/0213007 | A1 * | 7/2017 | Moturu ................... | G16H 40/20 |
| 2018/0174485 | A1 * | 6/2018 | Stankoulov .......... | G09B 19/167 |
| 2021/0067905 | A1 * | 3/2021 | Feldbeine ............. | H04W 4/029 |

FOREIGN PATENT DOCUMENTS

JP 2003-228798 A 8/2003
JP 4984334 B2 7/2012

* cited by examiner

*Primary Examiner* — Hussein Elchanti

(74) *Attorney, Agent, or Firm* — Birch, Stewart, Kolasch & Birch, LLP

(57) ABSTRACT

A navigation apparatus includes a log information acquisition portion acquiring log information including position information and time information at predetermined time intervals, a storage storing the log information, a transmitter transmitting the log information, and a transmitter controller transmitting to a server an excess piece of the log information exceeding a predetermined number in reverse chronological order of the time information.

11 Claims, 8 Drawing Sheets

| COMMAND ID | TIME INFORMATION | LATITUDE/ LONGITUDE | VEHICLE SPEED | LINK ID | LINK DIRECTION | DIRECTION CHANGE AMOUNT | GRADIENT ANGLE |
|---|---|---|---|---|---|---|---|
| 1000 | 190118173010 | x1 y1 | 60 | 1906443 | 0 | 10 | 20 |

(b)

| COMMAND ID | TIME INFORMATION | LATITUDE/ LONGITUDE | VEHICLE SPEED | LINK ID | LINK DIRECTION | DIRECTION CHANGE AMOUNT | GRADIENT ANGLE |
|---|---|---|---|---|---|---|---|
| 1000 | 190118173010 | x1 y1 | 60 | 1906443 | 0 | 10 | 20 |
| 1000 | 190118173011 | x1 y2 | 60 | 1906444 | 0 | 10 | 20 |
| 1000 | 190118173012 | x1 y3 | 60 | 1906445 | 0 | 10 | 20 |
| 1000 | 190118173013 | x1 y4 | 60 | 1906446 | 0 | 10 | 20 |
| 1000 | 190118173014 | x1 y5 | 60 | 1906447 | 0 | 10 | 20 |
| ⋮ | ⋮ | ⋮ | ⋮ | ⋮ | ⋮ | ⋮ | ⋮ |
| 1000 | 190118XXXXXX | x1 y6 | 60 | 1906448 | 0 | 10 | 20 |
| 1000 | 190118XXXXXX | x1 y7 | 60 | 1906449 | 0 | 10 | 20 |

(c)

| COMMAND ID | TIME INFORMATION | LATITUDE/ LONGITUDE | VEHICLE SPEED | LINK ID | LINK DIRECTION | DIRECTION CHANGE AMOUNT | GRADIENT ANGLE |
|---|---|---|---|---|---|---|---|
| 1000 | 190118173010 | x1 y1 | 60 | 1906443 | 0 | 10 | 20 |
| 1000 | 190118173011 | x1 y2 | 60 | 1906444 | 0 | 10 | 20 |
| 1000 | 190118173012 | x1 y3 | 60 | 1906445 | 0 | 10 | 20 |
| 1000 | 190118173013 | x1 y4 | 60 | 1906446 | 0 | 10 | 20 |
| 1000 | 190118173014 | x1 y5 | 60 | 1906447 | 0 | 10 | 20 |
| ⋮ | ⋮ | ⋮ | ⋮ | ⋮ | ⋮ | ⋮ | ⋮ |
| 1000 | 190118173015 | x1 y6 | 60 | 1906448 | 0 | 10 | 20 |
| 1000 | 190118173016 | x1 y7 | 60 | 1906449 | 0 | 10 | 20 |
| 1000 | 190118173017 | x1 y8 | 60 | 1906450 | 0 | 10 | 20 |

(d)

| COMMAND ID | TIME INFORMATION | LATITUDE/ LONGITUDE | VEHICLE SPEED | LINK ID | LINK DIRECTION | DIRECTION CHANGE AMOUNT | GRADIENT ANGLE |
|---|---|---|---|---|---|---|---|
|  |  |  | 60 |  |  |  |  |
| 1000 | 190118173011 | x1 y2 | 60 | 1906444 | 0 | 10 | 20 |
| 1000 | 190118173012 | x1 y3 | 60 | 1906445 | 0 | 10 | 20 |
| 1000 | 190118173013 | x1 y4 | 60 | 1906446 | 0 | 10 | 20 |
| 1000 | 190118173014 | x1 y5 | 60 | 1906447 | 0 | 10 | 20 |
| ⋮ | ⋮ | ⋮ | ⋮ | ⋮ | ⋮ | ⋮ | ⋮ |
| 1000 | 190118173015 | x1 y6 | 60 | 1906448 | 0 | 10 | 20 |
| 1000 | 190118173016 | x1 y7 | 60 | 1906449 | 0 | 10 | 20 |
| 1000 | 190118173017 | x1 y8 | 60 | 1906450 | 0 | 10 | 20 |

INFORMATION PROCESSING APPARATUS, INFORMATION PROCESSING METHOD AND PROGRAM

BACKGROUND

1. Technical Field

The present invention relates to an information processing apparatus, an information processing method, and a program capable of transmitting log information to a server while protecting personal information.

2. Related Art

As in JP 2003-228798 A, a technique of collecting travel logs from a navigation apparatus of a car navigation user via the Internet has heretofore been disclosed. JP 2003-228798 A describes performing a content business based on collected travel logs. For example, the content business is an information provision for a route search with traffic congestion prediction taken into consideration. In the technique disclosed in JP 2003-228798 A, a provider providing travel logs can set a protection level by himself/herself for protecting the privacy of the provider. Specifically, the provider can set the level so as not to transmit details of the date and time, position information for each second, etc. to a travel log collection center.

JP 4984343 B describes an ITS (Intelligent Transport Systems) transmitting position information indicative of a current position of an in-vehicle device to a roadside unit. The in-vehicle device disclosed in JP 4984343 B is configured such that position information of a vehicle acquired in a region predefined by a user is not transmitted to the roadside unit for personal information protection. For example, the position information of the vehicle is not transmitted in the region within a circle having a predetermined radius from a departure place or within a circle having a predetermined radius from a destination input by a user to the in-vehicle device for navigation. Alternatively, the position information of the vehicle is not transmitted in the region within a circle having a predetermined radius from a destination preliminarily stored in the in-vehicle device by a user. The departure place is likely to be a place where the individual can be identified, such as a user's home, and the technique as disclosed in JP 4984343 B can prevent leakage of personal information since the home, etc. are not identified from the transmitted position information.

However, in the technique disclosed in JP 2003-228798 A, a sufficient amount of travel logs may not be collected depending on the protection level set by the car navigation user, so that the collection of travel logs and the personal information protection cannot be achieved at the same time.

In the technique disclosed in JP 4984343 B, the user must store a destination in the in-vehicle device in advance so as to prevent the position information of the destination from being transmitted to the roadside unit while a navigation function is not used. However, it is not practical for the user to set all the destinations in the in-vehicle device in advance. Therefore, the technique disclosed in JP 4984343 B cannot achieve ease of collection while sufficiently protecting personal information.

SUMMARY

An object of the present invention is to provide an information processing apparatus, an information processing method, and a program capable of relatively easily acquiring log information indicative of a movement history of a moving body such as an automobile while protecting personal information.

An information processing apparatus according to one aspect of the present disclosure includes: a log information acquisition portion configured to acquire log information at predetermined time intervals, the log information including position information of a moving body and time information indicating a time when the position information was acquired; a storage configured to store each piece of the log information in chronological order; a transmitter configured to communicate to an external apparatus outside the moving body; and a transmitter controller configured to cause the transmitter to transmit the log information acquired in a situation where an amount of progress from a departure place of the moving body exceeds a predetermined value from the storage to the external apparatus, wherein the log information to be transmitted is an excess piece of the log information stored in the storage and exceeding a predetermined number in reverse chronological order of the time information.

An information processing method according to another aspect of the present disclosure includes the steps of: acquiring log information at predetermined time intervals, the log information including position information of a moving body and time information indicating a time when the position information was acquired; storing each piece of the log information in chronological order; and transmitting to an external apparatus outside the moving body the log information acquired in a situation where an amount of progress from a departure place of the moving body exceeds a predetermined value, wherein the log information to be transmitted in the step of transmitting is an excess piece of the log information stored in the step of storing and exceeding a predetermined number in reverse chronological order of the time information.

A non-transitory computer-readable recording medium according to another aspect of the present disclosure stores a program causing a computer to execute the steps of: acquiring log information at predetermined time intervals, the log information including position information of a moving body and time information indicating a time at which the position information was acquired; storing each piece of the log information in chronological order; and transmitting to an external apparatus outside the moving body the log information acquired in a situation where an amount of progress from a departure place of the moving body exceeds a predetermined value, wherein the log information to be transmitted in the step of transmitting is an excess piece of the log information stored in the step of storing and exceeding a predetermined number in reverse chronological order of the time information.

According to the present invention, the log information acquired at and around a destination can automatically be determined, and the log information can relatively easily be collected in a server while personal information is protected.

BRIEF DESCRIPTION OF THE DRAWINGS

FIG. 2 is an image diagram showing a process of storing log information into a first buffer and a process of deleting log information from the first buffer;

DESCRIPTION OF THE PREFERRED EMBODIMENTS

Aspects of the Present Disclosure

Figure 1:
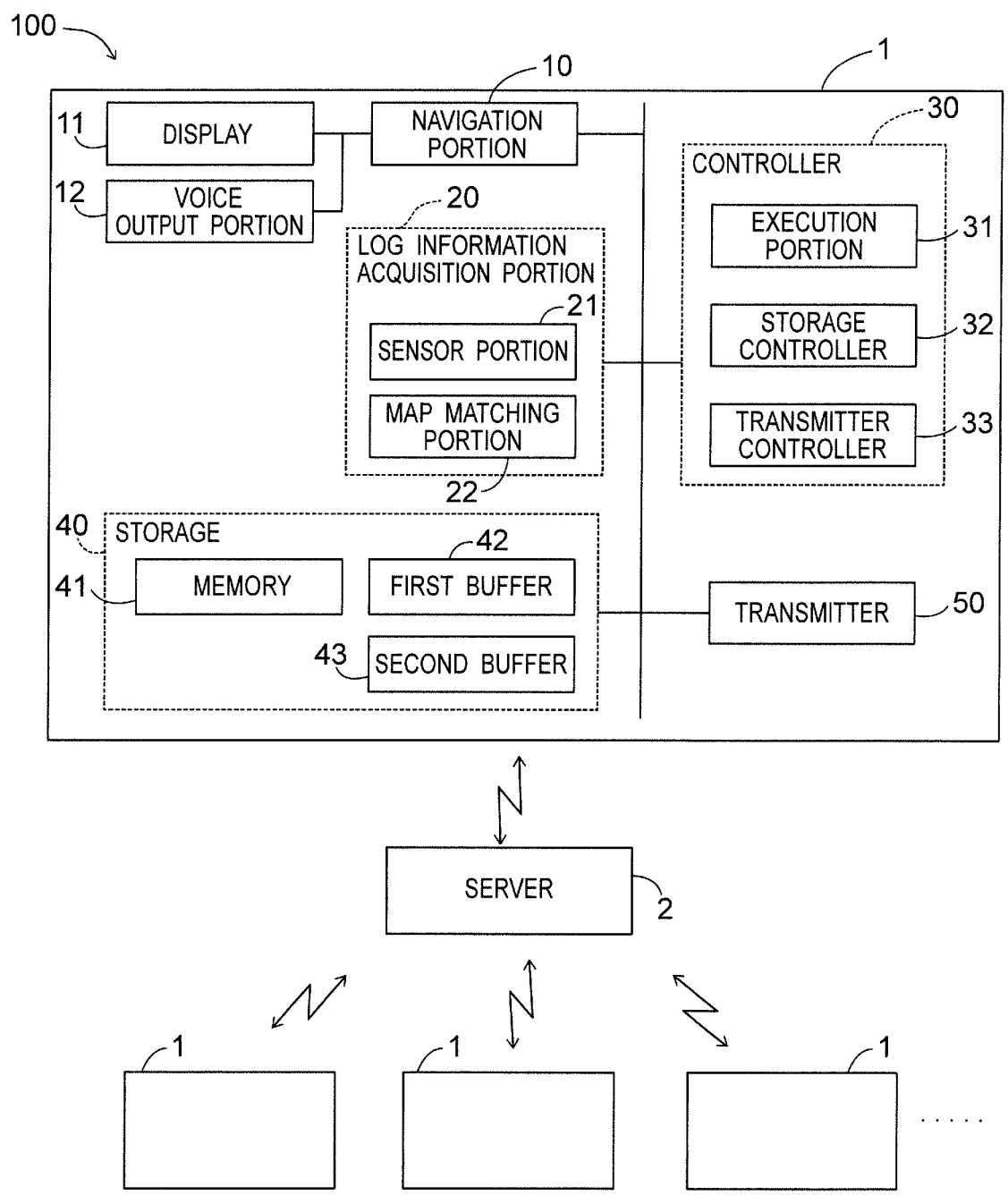
FIG. 1 is a configuration diagram showing an information collection and provision system including a navigation apparatus according to a first embodiment.

An information processing apparatus according to a first aspect of the present disclosure includes: a log information acquisition portion configured to acquire log information at predetermined time intervals, the log information including position information of a moving body and time information indicating a time when the position information was acquired; a storage configured to store each piece of the log information in chronological order; a transmitter configured to communicate to an external apparatus outside the moving body; and a transmitter controller configured to cause the transmitter to transmit the log information acquired in a situation where an amount of progress from a departure place of the moving body exceeds a predetermined value from the storage to the external apparatus, wherein the log information to be transmitted is an excess piece of the log information stored in the storage and exceeding a predetermined number in reverse chronological order of the time information.

The information processing apparatus of the first aspect can prevent the log information acquired at and around a destination from being automatically transmitted to the external apparatus. Therefore, the information processing apparatus can relatively easily collect the log information in the external apparatus while protecting personal information.

In the information processing apparatus according to a second aspect of the present disclosure, the amount of progress is a mileage of the moving body from the departure place and is obtained based on the log information, and further includes a storage controller configured to cause the storage to store the log information acquired in a situation where the mileage exceeds the predetermined value.

In the information processing apparatus according to a third aspect of the present disclosure, the storage controller causes the storage to store the log information including the position information different from the position information previously acquired by the log information acquisition portion.

In the information processing apparatus according to a fourth aspect of the present disclosure, the amount of progress is an elapsed time from start of acquisition of the log information by the log information acquisition portion and is obtained based on the log information, and further includes a storage controller configured to cause the storage to store the log information acquired in a situation where the elapsed time exceeds the predetermined value.

In the information processing apparatus according to a fifth aspect of the present disclosure, the log information is deleted from the storage in a situation where an ACC power supply of the moving body is switched off.

In the information processing apparatus according to a sixth aspect of the present disclosure, the transmitter controller causes the transmitter to transmit two or more pieces of the log information together to a server, the server being the external apparatus, at a predetermined timing.

In the information processing apparatus according to a seventh aspect of the present disclosure, the predetermined timing is a timing in a situation where the ACC power supply of the moving body is switched off.

In the information processing apparatus according to an eighth aspect of the present disclosure, each time the excess piece of the log information is generated, the transmitter controller causes the transmitter to transmit the excess piece of the log information to the server, the server being the external apparatus.

An information processing method according to a ninth aspect of the present disclosure includes the steps of: acquiring log information at predetermined time intervals, the log information including position information of a moving body and time information indicating a time when the position information was acquired; storing each piece of the log information in chronological order; and transmitting to an external apparatus outside the moving body the log information acquired in a situation where an amount of progress from a departure place of the moving body exceeds a predetermined value, wherein the log information to be transmitted in the step of transmitting is an excess piece of the log information stored in the step of storing and exceeding a predetermined number in reverse chronological order of the time information.

A non-transitory computer-readable recording medium according to the tenth aspect of the present disclosure stores a program causing a computer to execute the steps of: acquiring log information at predetermined time intervals, the log information including position information of a moving body and time information indicating a time when the position information was acquired; storing each piece of the log information in chronological order; and transmitting to an external apparatus outside the moving body the log information acquired in a situation where an amount of progress from a departure place of the moving body exceeds a predetermined value, wherein the log information to be transmitted in the step of transmitting is an excess piece of the log information stored in the step of storing and exceeding a predetermined number in reverse chronological order of the time information.

First Embodiment

FIG. 1 is a configuration diagram showing an information collection and provision system 100 including a navigation apparatus 1 according to a first embodiment of the present invention. The information collection and provision system 100 includes two or more navigation apparatuses 1 corresponding to information processing apparatuses, and a server 2. The navigation apparatus 1 is configured to be mountable on a moving body. The information collection and provision system 100 collects log information of multiple automobiles in the server 2. The log information is information indicative of a history of movement of the moving body. In this embodiment, the moving body is an automobile. The navigation apparatus 1 is configured not to transmit the log information acquired at and around a departure place, as well as the log information acquired at and around a destination to the server 2. The configuration of the navigation apparatus 1 will hereinafter be described in detail.

The navigation apparatus 1 includes a navigation portion 10, a display 11, a voice output portion 12, a log information acquisition portion 20, a controller 30, a storage 40, and a transmitter 50.

With a destination set by a user, the navigation portion 10 performs navigation for guiding a route. To perform the navigation, the navigation portion 10 performs a route search from a departure place to the destination. The navigation portion 10 causes the display 11 to display a map showing the route acquired through the route search. The navigation portion 10 causes the display 11 to display a map showing a current position of the automobile. This current position is identified by a map matching process. The map matching process will be described later. The navigation portion 10 causes the voice output portion 12 to output a guidance voice for guiding the route.

The log information acquisition portion 20 acquires log information indicative of a movement history of the automobile on which the navigation apparatus 1 is mounted. This information will hereinafter also simply be referred to as "log information". The log information acquisition portion 20 includes a sensor portion 21 and a map matching portion 22.

The sensor portion 21 includes a GPS (Global Positioning System) sensor, a vehicle speed sensor, a gyro sensor, and an acceleration sensor. The log information acquisition portion 20 acquires position information indicative of the current position of the automobile on which the navigation apparatus 1 is mounted, based on a signal from the GPS sensor. This position information will hereinafter also simply be referred to as "position information". The log information acquisition portion 20 acquires time information indicating the time at which the position information is acquired, based on a signal from the GPS sensor. This information will hereinafter also simply be referred to as "time information".

In this embodiment, the position information is latitude information and longitude information. However, the position information is not limited to latitude information and longitude information, but may be other information. The position information may further include at least one of height information indicative of height, elevation information indicative of elevation, and altitude information indicative of altitude. In this embodiment, the time information includes information indicative of the year, month, and date when the position information is acquired, as shown in FIG. 2. The information indicative of the year is represented by the last two digits of the year, for example. The log information acquisition portion 20 sends the acquired position information to the map matching portion 22.

The log information acquisition portion 20 acquires vehicle speed information indicative of the vehicle speed of the automobile on which the navigation apparatus 1 is mounted, based on a signal from the vehicle speed sensor. This information will hereinafter also simply be referred to as "vehicle speed information".

In this embodiment, the sensor portion 21 may be configured not to include at least one of the gyro sensor and the acceleration sensor. Alternatively, the sensor section 21 may be configured to further include a sensor other than the sensors described above.

The map matching portion 22 performs a map matching process based on the position information. The map matching process is a process of correcting the latitude information and the longitude information acquired by the sensor portion 21 to a position on a road represented by the map information. The map information includes road information. The road information included in this map information is represented by a combination of nodes and links. For example, the nodes are set to intersections and ends of roads. For example, the links are each set to a road connecting adjacent nodes. Each of the links is associated with a link ID (identification). The map information may include, for each link, information indicative of a road shape, road latitude and longitude, a road curvature, a road gradient, a road direction, a road traffic direction, etc. The map information may also include information on road types such as an expressway and a general road. This map information is stored in a memory 41 included in the storage 40.

The map matching portion 22 superimposes the position of the automobile indicted by the latitude information and the longitude information on the map information and obtains a link corresponding to the superimposed position. The map matching portion 22 acquires link ID information corresponding to the obtained link. The map matching portion 22 acquires link direction information indicative of a traveling direction of the automobile, based on information on the road traffic direction corresponding to the link. The map matching portion 22 acquires direction change amount information indicative of a rotation angular amount of the automobile, based on a signal from the gyro sensor, the road direction information corresponding to the link, etc. The map matching portion 22 acquires gradient angle information indicative of a gradient angle of the automobile based on a signal from the acceleration sensor, the road gradient information corresponding to the link, etc.

The log information acquisition portion 20 acquires command ID (identification) information unique to each of the navigation apparatuses 1. In this way, the log information acquisition portion 20 acquires the log information including the command ID information, the position information, the time information, the vehicle speed information, the link ID information, the link direction information, the direction change amount information, and the gradient angle information. The log information acquisition portion 20 acquires the log information at regular time intervals. For example, the regular time interval is every second.

The log information may not include at least one of the command ID information, the link ID information, the link direction information, the direction change amount information, and the gradient angle information. Alternatively, the log information may further include information other than the pieces of information described above. For example, the log information may include information on a user's automobile operation history.

The storage 40 is configured as any storage device such as a flash memory and stores various types of information. The storage 40 includes the memory 41, a first buffer 42, and a second buffer 43. The memory 41 stores various programs, etc. executed by the navigation apparatus 1. The memory 41 stores the map information necessary for the map matching process by the map matching portion 22 and the navigation by the navigation portion 10.

The first buffer 42 stores the log information in chronological order. The second buffer 43 stores the log information transmitted from the first buffer 42. In this embodiment, the first buffer 42 is a volatile memory that cannot retain information unless electric power is supplied. The second buffer 43 is a nonvolatile memory that can retain information without an electric power supply. Therefore, the first buffer 42 is reset with an ACC (accessory) power supply of the automobile switched off. In other words, in situations where the ACC power supply is switched off, the first buffer 42 automatically deletes the stored log information. On the other hand, the stored log information is not deleted from the second buffer 43, even with the ACC power supply switched off. The log information to be transmitted to the server 2 is stored in the second buffer 43. Therefore, since the second buffer 43 is a nonvolatile memory, the log information stored in the second buffer 43 can be transmitted to the server 2 even with no electric power supplied to the second buffer 43.

The controller 30 includes an execution portion 31, a storage controller 32, and a transmitter controller 33.

The execution portion 31 detects turning-on/off of the ACC power supply of the automobile. The execution portion 31 executes an acquisition mode for acquiring the log information. Specifically, detecting the turning-on of the ACC power supply, the execution portion 31 transmits a signal indicating that the ACC power supply is switched on to the log information acquisition portion 20. Receiving this signal, the log information acquisition portion 20 starts acquiring the log information. As a result, the acquisition mode is started. Detecting the turning-off of the ACC power supply, the execution portion 31 transmits a signal indicating that the ACC power supply is switched off to the log information acquisition portion 20. Receiving this signal, the log information acquisition portion 20 stops acquiring the log information. As a result, the acquisition mode is stopped. Therefore, even while the navigation is not being performed by the navigation portion 10, the navigation apparatus 1 performs the acquisition mode to acquire the log information. The navigation apparatus 1 may be configured to perform the acquisition mode only while navigation is performed.

Detecting the turning-off of the ACC power supply, the execution portion 31 transmits a signal indicating that the ACC power supply is switched off to the transmitter controller 33. The transmitter controller 33 controls the transmitter 50. Receiving the signal indicating that the ACC power supply is switched off, the transmitter controller 33 causes the transmitter 50 to transmit the log information stored in the second buffer 43 to the server 2. Therefore, the transmitter controller 33 causes the transmitter 50 to transmit the log information stored in the second buffer 43 to the server 2 with the execution mode stopped.

The transmitter 50 is communicably connected to the server 2. The transmitter 50 functions as a transmitter transmitting information to the server 2. The transmitter 50 also functions as a reception portion receiving information transmitted from the server 2. In this embodiment, the transmitter 50 is a TCU (telecommunication control unit). The transmitter 50 may communicably be connected to an apparatus not limited to the server 2. The transmitter 50 may have any configuration that can transmit information to any apparatus capable of collecting information. The transmitter 50 may be an input and output portion such as a USB (Universal Serial Bus) terminal into which a USB memory can be inserted for information transfer. The input and output portion inputs information from the USB memory and outputs information to the USB memory.

The execution portion 31 may be configured to start the acquisition mode with an engine of the automobile turned on. Alternatively, the execution portion 31 may be configured to start the acquisition mode with any button for starting the acquisition mode pressed. The execution portion 31 may be configured to stop the acquisition mode with the engine of the automobile stopped. Alternatively, the execution portion 31 may be configured to stop the acquisition mode with any button for stopping the acquisition mode pressed.

The storage controller 32 controls both the first buffer 42 and the second buffer 43. The log information acquisition portion 20 acquiring the log information, the storage controller 32 obtains an amount of progress from the departure place of the automobile based on the log information. The storage controller 32 then determines whether the amount of progress exceeds a predetermined value. In this embodiment, the storage controller 32 obtains a mileage of the automobile after turning-on of the ACC power supply as the amount of progress. In this description, the mileage of the automobile means a distance traveled by the automobile. This mileage will hereinafter also be referred to as "cumulative mileage". In this embodiment, the cumulative mileage is obtained based on the vehicle speed information. Since the cumulative mileage is obtained based on the vehicle speed information, the cumulative mileage can accurately be obtained even with the automobile running on a curved road, for example. The cumulative mileage may be obtained based on other information such as the position information.

The storage controller 32 determines whether the cumulative mileage exceeds a predetermined value. This predetermined value will hereinafter also be referred to as "first threshold value". In this embodiment, the first threshold value is 5 kilometers. The first threshold value may be set to a larger or smaller value than this value. The storage controller 32 also determines whether the position information included in the log information is identical to the position information included in the log information previously acquired by the log information acquisition portion 20. This determination is made for the log information acquired in a situation where the cumulative mileage is determined as exceeding the first threshold value. The storage controller 32 causes the first buffer 42 to store thereinto the log information including the position information determined as not being identical to the previously acquired position information.

The log information acquired in a situation where the cumulative mileage is determined as exceeding the first threshold value is the log information acquired at a place where the automobile has moved more than 5 kilometers from the departure place. On the other hand, the log information acquired in a situation where the cumulative mileage is not determined as exceeding the first threshold value is the log information acquired at a place within 5 kilometers from the departure place. The departure place is likely to include personal information such as the location of the user's home, for example. Moreover, for example, information enabling identification of the personal information such as the location of the user's home is likely to be included around the departure place. Therefore, the log information acquired in a situation where the cumulative mileage is not determined as exceeding the first threshold value is information not to be transmitted to the server 2.

The log information having the position information not determined as being identical to the previously acquired position information is the log information acquired while the automobile is moving. On the other hand, the log information having the position information determined as being identical to the previously acquired position information is the log information acquired during stop of the automobile. The log information acquired during stop of the automobile is information not to be transmitted to the server 2 since the position information, the link ID information, etc. are overlapped.

In this embodiment, whether the position information is identical is determined after determination on whether the cumulative mileage exceeds the first threshold value in the log information; however, the order of determination may be reversed. The storage controller 32 may be configured not to determine whether the position information is identical to the previously acquired position information for the log information.

Pieces of the log information stored in the first buffer 42 exceeding a predetermined number, the storage controller 32 causes the second buffer 43 to store thereinto an excess piece of the log information exceeding the predetermined number in reverse chronological order of the time information. Specifically, each time the log information is newly stored in the first buffer 42 after the log information having the cumulative mileage exceeding the predetermined threshold value is stored in the first buffer 42, the storage controller 32 causes the second buffer 43 to store thereinto a piece of the log information having the oldest time information in the log information stored in the first buffer 42. This threshold value will hereinafter also be referred to as a second threshold value. The second threshold value may be any value larger than the first threshold value. In this embodiment, the second threshold value is a value that is twice as large as the first threshold value, i.e., 10 kilometers. After storing the piece of the log information having the oldest time information into the second buffer 43, the storage controller 32 deletes the piece of the log information having the oldest time information from the first buffer 42.

FIG. 2 is an image diagram showing a process of storing the log information into the first buffer 42 and a process of deleting the log information from the first buffer 42. As shown in FIGS. 2 (*a*) and (*b*), the storage controller 32 sequentially causes the first buffer 42 to store pieces of the log information having the position information determined as not being identical thereto. Subsequently, the first buffer 42 reaches a state in which a predetermined number of pieces of the log information is stored as shown in FIG. 2 (*c*). With a piece of log information 32*a* acquired in a situation where the cumulative mileage exceeds the second threshold value then stored into the first buffer 42 as shown in FIG. 2 (*c*), the storage controller 32 transmits to the second buffer 43 a piece of log information 32*b* having the oldest acquisition time in the log information stored in the first buffer 42. Subsequently, the storage controller 32 deletes the piece of the log information 32*b* having the oldest acquisition time from the first buffer 42 as shown in FIG. 2 (*d*).

In this way, the storage controller 32 causes the first buffer 42 to temporarily retain the log information acquired in a situation where the cumulative mileage is not exceeding the second threshold value and causes the second buffer 43 to store the log information acquired in a situation where the cumulative mileage exceeds the second threshold value. In other words, the storage controller 32 temporarily retains the predetermined number of pieces of the log information acquired in a situation where the cumulative mileage is not exceeding the second threshold value in the first buffer 42 and stores an excess piece of the log information exceeding the predetermined number into the second buffer 43.

In this embodiment, the upper limit number of pieces of the log information temporarily retained in the first buffer 42 is not fixed and varies. For example, in a situation where the movement speed of the automobile is high, the cumulative mileage exceeds 10 km even though the number of pieces of the log information is relatively small. On the other hand, in a situation where the movement speed of the automobile is low, more pieces of the log information are required before the cumulative mileage exceeds 10 kilometers as compared to a situation where the movement speed of the automobile is high.

The method of storing the excess piece of the log information into the second buffer 43 is not limited to the method described above. For example, the storage controller 32 may be configured to use a difference between the cumulative mileage of the log information having the newest time information and the cumulative mileage of the log information having the oldest time information in the log information stored in the first buffer 42. In this case, determining that the difference exceeds a predetermined threshold value, the storage controller 32 causes the second buffer 43 to store the log information having the oldest time information thereinto. The predetermined threshold value in this configuration may be a value causing a difference between the cumulative mileage of the log information having the newest time information and the cumulative mileage of the log information having the oldest time information and may be, for example, the same value as the threshold value, i.e., 5 kilometers.

The storage controller 32 deletes the log information stored in the first buffer 42 and the log information stored in the second buffer 43 at a predetermined timing. As described above, with the excess piece of the log information 32*b* transmitted to the second buffer 43, the storage controller 32 deletes the piece of the log information 32*b* from the first buffer 42. By deleting from the first buffer 42 the piece of the log information 32*b* transmitted to the second buffer 43, a capacity used in the first buffer 42 can be reduced. With the ACC power supply switched off and the piece of the log information 32*b* is transmitted from the second buffer 43 to the server 2, the storage controller 32 resets the second buffer 43. In other words, the storage controller 32 deletes from the second buffer 43 the piece of the log information 32*b* transmitted to the server 2.

The timing of switching-off of the ACC power supply is presumed as the timing at which the automobile arrives at the destination. The destination is likely to include personal information such as the location of the user's workplace, for example. Moreover, for example, information enabling identification of the personal information such as the location of the user's workplace is likely to be included around the destination. The log information temporarily retained in the first buffer 42 is the log information acquired at and around the destination. This log information is deleted in the navigation apparatus 1 and is not transmitted to the server 2. Therefore, even if the user does not set the destination in advance, the navigation apparatus 1 can prevent the log information acquired at and around the destination from being automatically transmitted to the server 2.

The functions of the navigation portion 10 and the controller 30 described above are implemented by software, etc. The software, etc. are described as a program and stored in the memory 41. A CPU (central processing unit), not shown, reads and executes the program stored in the memory 41 and thereby implements the functions of the navigation portion 10 and the controller 30. Instead of the CPU, an MPU (micro processing unit) 611 shown in FIG. 8 may be used.

The information collection and provision system 100 including the navigation apparatus 1 as described above collects information from the navigation apparatus 1 and provides information to the navigation apparatus 1. Specifically, the information collection and provision system 100 has an information collection function, an information accumulation function, an information analysis function, and a user management function. The information collection function is a function of collecting the log information including a movement history and an operation history of the automobile by using the navigation apparatus 1. The information accumulation function is a function of accumulating the log information acquired by the navigation apparatus 1 in the server 2. The information analysis function is a function of analyzing and converting the log information stored in the server 2 into information usable for various services. For the information analysis function, an AI (artificial intelligence) analysis function implemented by utilizing AI may be used. The user management function is a function of managing users who can use the functions and the services. The user management function is a function of managing a group formed by grouping the users using the services.

Examples of the services include a service of providing traffic information to a user. The service may be a service of proposing an optimal route to a user. Providing this route proposal service, the information collection and provision system 100 first uses the information analysis function to obtain a user's driving level based on the log information. The information collection and provision system 100 proposes an optimal route for the user depending on the obtained driving level. For example, the optimal route for the user may be a route for a skilled driver using a back road, a route for an inexperienced driver using a road with less traffic, etc.

The information collection and provision system 100 can propose a fuel-efficient route to the user by using information on a road gradient angle, etc. The information collection and provision system 100 may use information on a road curvature, etc. to provide information for assisting safe driving by causing a user to recognize a blind spot on a curved road. In other cases, the log information transmitted to the server 2 can be utilized as big data for various purposes.

In a situation where the services are used, the navigation apparatus 1 receives information transmitted from the server 2 with the transmitter 50.

Figure 3:
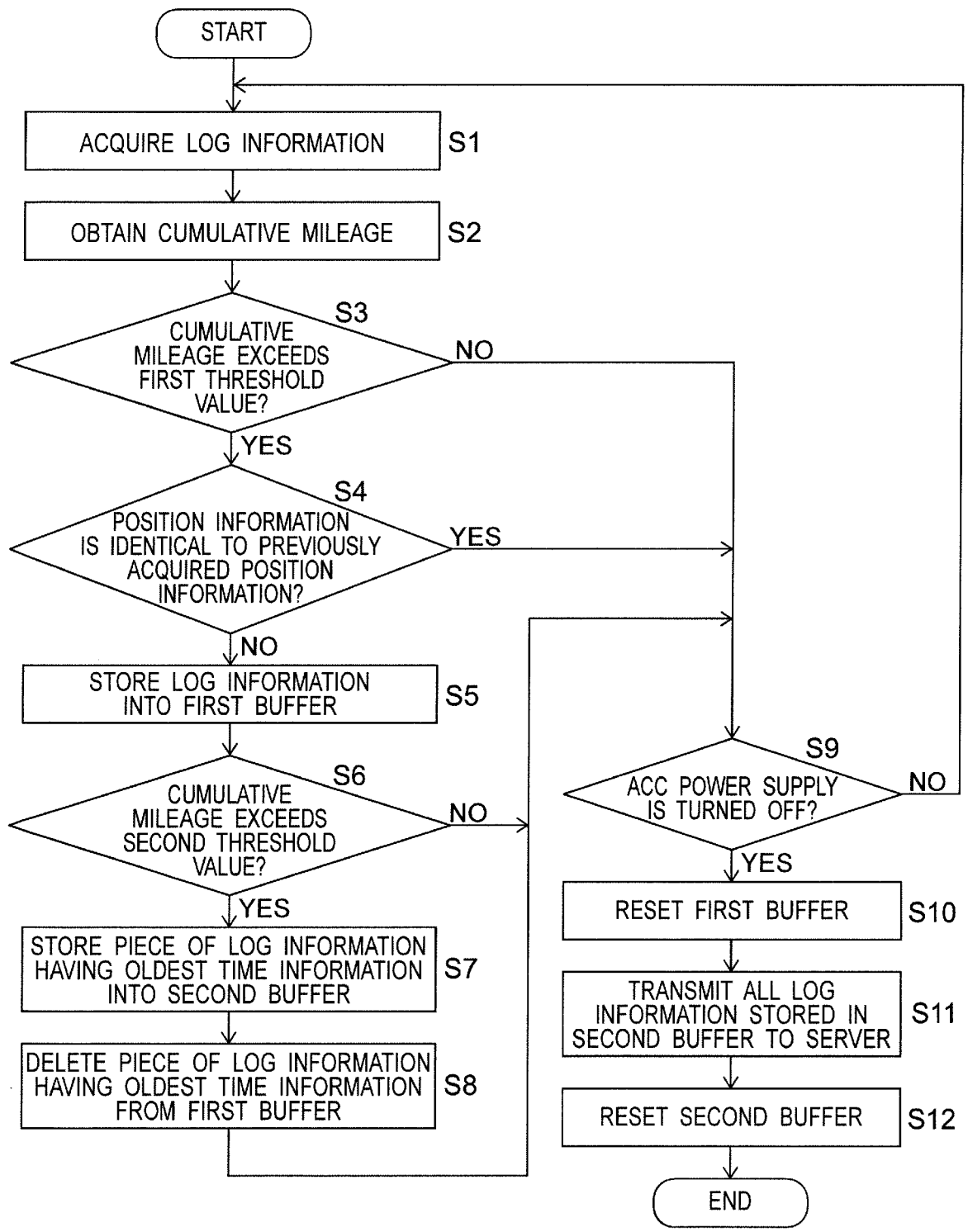
FIG. 3 is a flowchart showing a log information transmission process of the navigation apparatus according to the first embodiment.

Processes of the navigation apparatus 1 of this embodiment will hereinafter specifically be described. FIG. 3 is a flowchart showing a log information transmission process in the navigation apparatus 1 of this embodiment. This flowchart is started with the execution portion 31 detecting that the ACC power supply of the automobile is switched on.

At step S1, the log information acquisition portion 20 acquires log information.

At step S2, the storage controller 32 obtains a cumulative mileage based on the log information acquired by the log information acquisition portion 20 at step S1.

At step S3, the storage controller 32 determines whether the cumulative mileage obtained at step S2 exceeds the first threshold value. If it is determined that the cumulative mileage exceeds the first threshold value, the process goes to step S4. If it is not determined that the cumulative mileage exceeds the first threshold value, the process goes to step S9.

At step S4, the storage controller 32 determines whether the position information included in the log information acquired by the log information acquisition portion 20 at step S1 is identical to the position information included in the previously acquired log information. If it is determined that the position information is identical to the previously acquired position information, the process goes to step S9.

If it is not determined that the position information is identical to the previously acquired position information, the process goes to step S5.

At step S5, the storage controller 32 causes the first buffer 42 to store the log information acquired by the log information acquisition portion 20 at step S1.

At step S6, the storage controller 32 determines whether the cumulative mileage acquired at step S2 exceeds the second threshold value. If it is determined that the cumulative mileage exceeds the second threshold value, the process goes to step S7. If it is not determined that the cumulative mileage exceeds the second threshold value, the process goes to step S9.

At step S7, the storage controller 32 causes the second buffer 43 to store the piece of the log information 32b having the oldest time information in the log information stored in the first buffer 42. The piece of the log information 32b corresponds to the excess piece of the log information 32b exceeding the predetermined number.

At step S8, the storage controller 32 deletes from the first buffer 42 the piece of the log information 32b stored into the second buffer 43 at step S7.

At step S9, the transmitter controller 33 determines whether a signal indicative of switching-off of the ACC power supply is input from the execution portion 31. If it is determined that the signal is input, the process goes to step S10. If it is not determined that the signal is input, the process returns to step S1.

At step S10, the first buffer 42 is reset. This is because the ACC power supply is switched off and the power supply to the first buffer 42 is stopped. As a result, all the log information stored in the first buffer 42 is deleted.

At step S11, the transmitter controller 33 causes the transmitter 50 to transmit all the log information 32b stored in the second buffer 43 to the server 2.

At step S12, the storage controller 32 resets the second buffer 43. In other words, the storage controller 32 deletes all the log information 32b stored in the second buffer 43. Completing these processes, the navigation apparatus 1 terminates this process.

As described above, the navigation apparatus 1 of this embodiment includes the log information acquisition portion 20, the first buffer 42, the transmitter 50, and the transmitter controller 33. The log information acquisition portion 20 acquires the log information including the position information of the automobile and the time information of acquisition of the position information at predetermined time intervals. The first buffer 42 stores the log information in chronological order. The transmitter 50 is communicably connected to the server 2 that is an external apparatus outside the automobile and transmits the log information 32b to the server 2. The transmitter 50 corresponds to a transmitter. If the log information acquired with the amount of progress from the departure place of the automobile exceeding a predetermined value is stored in the first buffer 42 in excess of a predetermined number, the transmitter controller 33 causes the transmitter 50 to transmit to the server 2 the excess piece of the log information 32b exceeding the predetermined number in reverse chronological order of the time information.

Therefore, the navigation apparatus 1 of this embodiment can prevent the log information acquired with the amount of progress from the departure place not exceeding the predetermined value, i.e., the log information acquired at and around the departure place, from being transmitted to the server 2. Additionally, the navigation apparatus 1 can prevent the log information not exceeding the predetermined number in reverse chronological order of the time information, i.e., the log information acquired at and around the destination, from being transmitted to the server 2. Therefore, even while the destination is not set by the user, the navigation apparatus 1 of this embodiment can automatically determine the log information acquired at and around the destination so as to prevent the log information from being transmitted to the server 2. Consequently, the navigation apparatus 1 can relatively easily collect the log information in the server 2 while sufficiently protecting the personal information.

The navigation apparatus 1 further includes the storage controller 32 that obtains a mileage of the automobile from the departure place based on the log information and that causes the first buffer 42 to store the log information acquired in a situation where the cumulative mileage, i.e., the mileage, exceeds the first threshold value, as the log information acquired with the amount of progress exceeding a predetermined value. Therefore, for example, even if the automobile stays at or around the departure place for a long time while the acquisition mode is performed, the log information at and around the departure place can be prevented from being transmitted to the server 2.

In the navigation apparatus 1, the storage controller 32 causes the first buffer 42 to store the log information including the position information different from the position information previously acquired by the log information acquisition portion 20 and therefore can reduce a capacity used in the first buffer 42 and prevent unnecessary data including overlapped position information, etc. from being transmitted to the server 2.

The navigation apparatus 1 is configured to include the volatile first buffer 42 from which the log information is deleted with the ACC power supply of the automobile switched off. Therefore, the navigation apparatus 1 can relatively easily delete the log information acquired at and around the destination in the navigation apparatus 1 and can prevent the log information acquired at and around the destination from being transmitted to the server 2.

In the navigation apparatus 1, the transmitter controller 33 causes the transmitter 50 to transmit two or more pieces of the log information together to the server 2 at the timing of switching-off of the ACC power supply of the automobile. Therefore, the navigation apparatus 1 can reduce a load on the server 2 caused by frequently receiving the log information 32*b* and can transmit the log information 32*b* including the relatively new time information to the server 2.

The log information transmission process in the navigation apparatus 1 of this embodiment is implemented by the CPU (not shown) reading and executing the program stored in the memory 41. A non-transitory computer-readable recording medium storing such a program may be provided.

Second Embodiment

Figure 4:
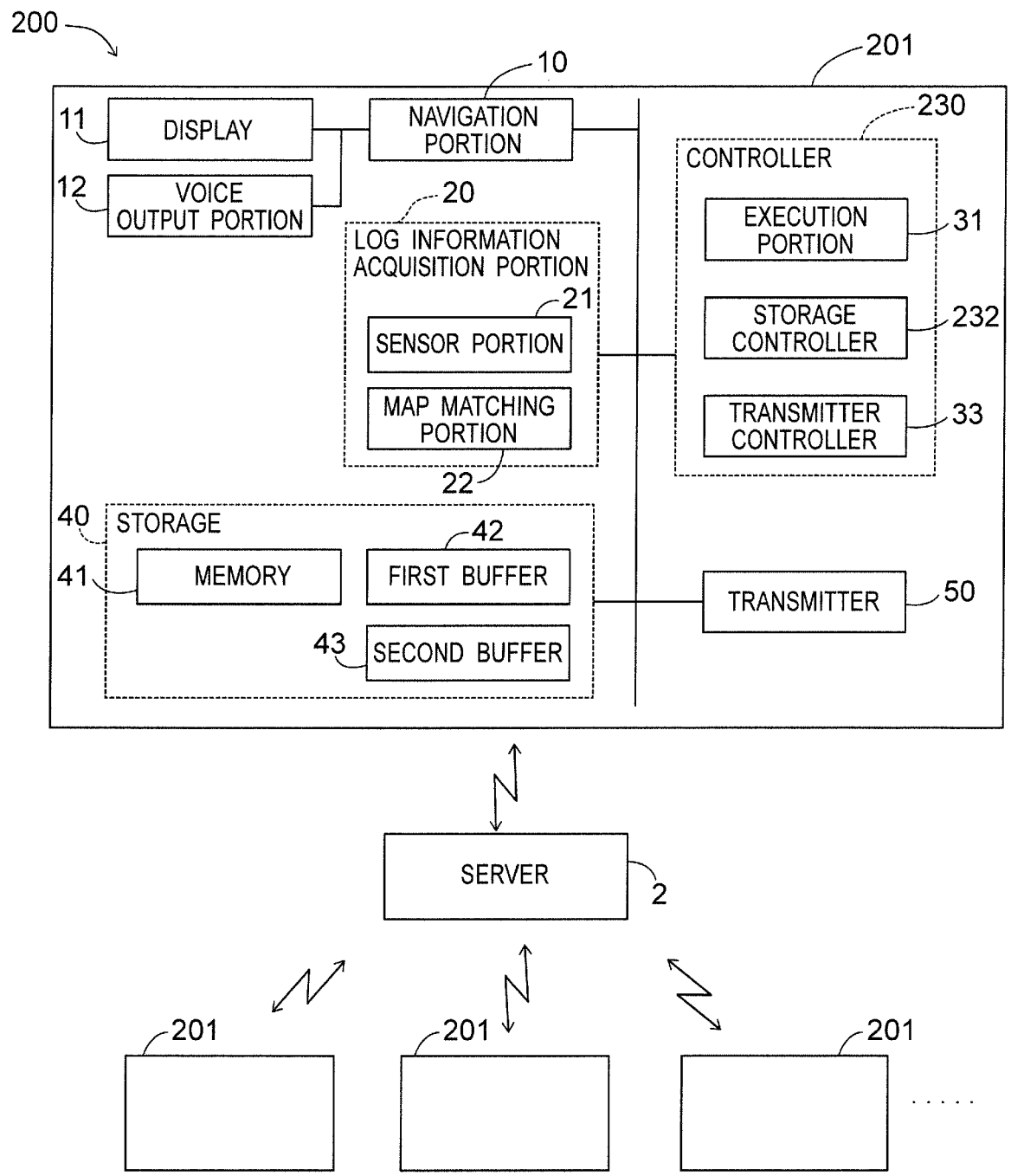
FIG. 4 is a configuration diagram showing an information collection and provision system including a navigation apparatus according to a second embodiment.

FIG. 4 is a configuration diagram showing an information collection and provision system 200 including a navigation apparatus 201 according to a second embodiment of the present invention. The information collection and provision system 200 is made up of two or more navigation apparatuses 201 corresponding to information processing apparatuses and the server 2. The navigation apparatus 200 of the second embodiment is different from the navigation apparatus 1 of the first embodiment in the method of identifying the amount of progress.

The navigation apparatus 201 of this embodiment includes the navigation portion 10, the display 11, the voice output portion 12, the log information acquisition portion 20, a controller 230, the storage 40, and the transmitter 50. The navigation apparatus 201 of this embodiment has the constituent elements of the controller 230 different from the constituent elements of the navigation apparatus 1 of the first embodiment. The other constituent elements are the same as those of the navigation apparatus 1 of the first embodiment and are therefore denoted by the same reference numerals and will not be described.

The controller 230 includes the execution portion 31, a storage controller 232, and the transmitter controller 33. In the configuration of the controller 230 in this embodiment, the configuration of the storage controller 232 is different from the configuration of the first embodiment.

In this embodiment, the storage controller 232 obtains an elapsed time from switching-on of the ACC power supply of the automobile as the amount of progress based on the log information. This elapsed time will hereinafter also be referred to as a cumulative elapsed time. This cumulative elapsed time can also be considered as an elapsed time from the start of acquisition of the log information by the log information acquisition portion 20. The cumulative elapsed time is obtained based on the time information included in the log information.

In this embodiment, the storage controller 232 determines whether the cumulative elapsed time exceeds a predetermined value. This predetermined value will hereinafter be referred to as a first threshold value. Therefore, the storage controller 232 determines whether the cumulative elapsed time exceeds the first threshold value. In this embodiment, the first threshold value is 15 minutes. The first threshold value may be set to a value larger or smaller than this time. The first threshold value may have a value varying depending on a season, etc. For example, the first threshold value may be set in summer and winter to a value larger than a value in spring and autumn in consideration of the time during which the user adjusts the temperature inside the automobile by cooling or heating before departure.

The storage controller 232 causes the first buffer 42 to store the log information acquired in a situation where the cumulative elapsed time is determined as exceeding the first threshold value. The log information acquired in a situation where the cumulative elapsed time is determined as exceeding the first threshold value is the log information acquired at the elapse of 15 minutes from switching-on of the ACC power supply of the automobile. On the other hand, the log information acquired in a situation where the cumulative elapsed time is not exceeding the first threshold value is the log information acquired within 15 minutes from switching-on of the ACC power supply of the automobile. This log information is the log information acquired at and around the departure place and is likely to include personal information or information enabling identification of the personal information.

With pieces of the log information stored in the first buffer 42 exceeding a predetermined number, the storage controller 232 causes the second buffer 43 to store an excess piece of the log information exceeding the predetermined number in reverse chronological order of the time information. Specifically, each time the log information is newly stored in the first buffer 42 after the log information having the cumulative elapsed time exceeding the predetermined threshold value is stored in the first buffer 42, the storage controller 232 causes the second buffer 43 to store a piece of the log information having the oldest time information in the log information stored in the first buffer 42. This threshold value will hereinafter also be referred to as a second threshold value. The second threshold value may be any value larger than the first threshold value. In this embodiment, the second threshold value is a value that is twice as large as the first threshold value. Specifically, the second threshold value is 30 minutes. After storing the piece of the log information having the oldest time information into the second buffer 43, the storage controller 232 deletes the piece of the log information having the oldest time information from the first buffer 42.

Figure 5:
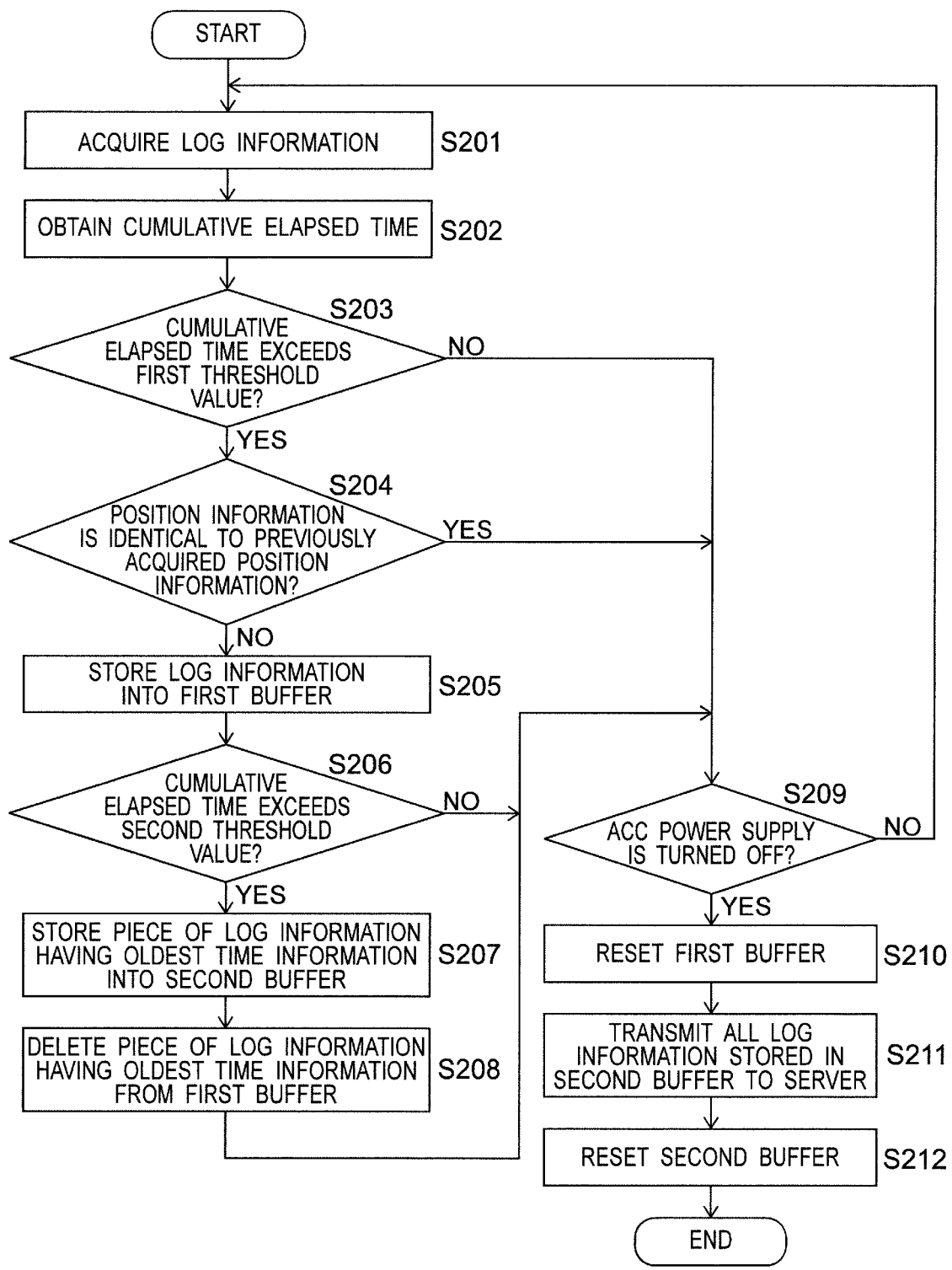
FIG. 5 is a flowchart showing a log information transmission process of the navigation apparatus according to the second embodiment.

Processes of the navigation apparatus 201 of this embodiment will hereinafter specifically be described. FIG. 5 is a flowchart showing a log information transmission process in the navigation apparatus 201 of this embodiment. This flowchart is started with the ACC power supply of the automobile turned on.

The process of step S201 is the same as the process of step S1 executed by the navigation apparatus 1 of the first embodiment.

At step S202, the storage controller 232 obtains a cumulative elapsed time based on the log information acquired by the log information acquisition portion 20 a step S201.

At step S203, the storage controller 232 determines whether the cumulative elapsed time obtained at step S202 exceeds the first threshold value. If it is determined that the cumulative elapsed time exceeds the first threshold value, the process goes to step S204. If it is not determined that the cumulative elapsed time exceeds the first threshold value, the process goes to step S209.

The processes of steps S204 to S205 are the same as the processes of steps S4 to S5 executed in the navigation apparatus 1 of the first embodiment.

At step S206, the storage controller 232 determines whether the cumulative elapsed time obtained at step S202 exceeds the second threshold value. If it is determined that the cumulative elapsed time exceeds the second threshold value, the process goes to step S207. If it is not determined that the cumulative elapsed time exceeds the second threshold value, the process goes to step S209.

The processes of steps S207 to S212 are the same as the processes of steps S7 to S12 executed in the navigation apparatus 1 of the first embodiment. Completing these processes, the navigation apparatus 201 terminates the log information transmission process.

As described above, the navigation apparatus 201 according to this embodiment further includes the storage controller 232 that obtains the cumulative elapsed time from the start of acquisition of the log information by the log information acquisition portion 20 based on the log information and that causes the first buffer 42 to store the log information having the cumulative elapsed time exceeding the first threshold value as the log information acquired at a position of the automobile having gone beyond a predetermined range around the departure place. Therefore, the upper limit number of pieces of the log information stored in the first buffer 42 is determined in advance in the navigation apparatus 201, so that the design of the first buffer 42 etc. can be facilitated.

Third Embodiment

Figure 6:
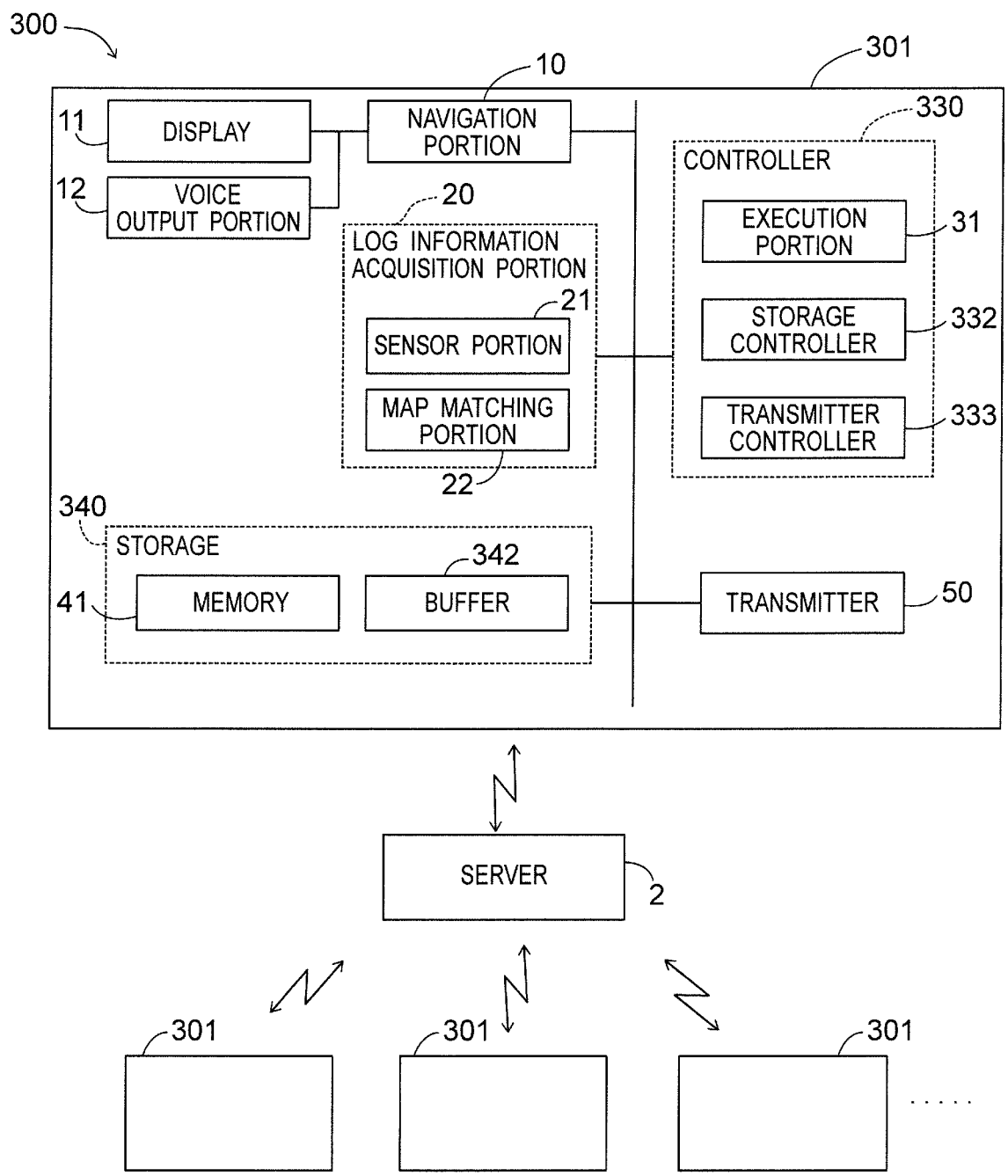
FIG. 6 is a configuration diagram showing an information collection and provision system including a navigation apparatus according to a third embodiment.

FIG. 6 is a configuration diagram showing an information acquisition system 300 including a navigation apparatus 301 according to a third embodiment of the present invention. The information collection and provision system 300 is made up of two or more navigation apparatuses 301 corresponding to information processing apparatuses and the server 2. The navigation apparatus 301 of this embodiment is different from the navigation apparatus 1 of the first embodiment in that an excess piece of the log information 32b is transmitted to the server 2 each time the excess piece of the log information 32b is generated.

The navigation apparatus 301 of this embodiment includes the navigation portion 10, the display 11, the voice output portion 12, the log information acquisition portion 20, a controller 330, a storage 340, and the transmitter 50. The navigation apparatus 301 of this embodiment has the constituent elements of the controller 330 and the storage 340 different from the constituent elements of the first embodiment. The other constituent elements are the same as those of the first embodiment and are therefore denoted by the same reference numerals and will not be described.

The storage 340 includes the memory 41 and a buffer 342. The memory 41 has the same configuration as the memory 41 included in the navigation apparatus 1 of the first embodiment. The buffer 342 has the same configuration as the first buffer 42 included in the navigation apparatus 1 of the first embodiment.

The controller 330 includes the execution portion 31, a storage controller 332, and a transmitter controller 333. In the controller 330 of this embodiment, the configurations of the storage controller 332 and the transmitter controller 333 are different from the configurations of the first embodiment.

The storage controller 332 causes the buffer 342 to store a piece of the log information including the position information different from the position information included in a previously acquired piece of the log information out of the log information acquired in a situation where the cumulative mileage is determined as exceeding the first threshold value. The storage controller 332 determines whether the cumulative mileage exceeds the second threshold value for the log information stored in the buffer 342. The first threshold value and the second threshold value in this embodiment are the same as the first threshold value and the second threshold value in the first embodiment.

While the log information 32a acquired in a situation where the cumulative mileage is determined as exceeding the second threshold value is stored in the buffer 342, the transmitter controller 333 causes the transmitter 50 to transmit to the server 2 the piece of the log information 32b having the oldest time information in the log information stored in the buffer 342. This transmission process to the server 2 is subsequently executed each time a new piece of the log information is stored in the buffer 342. Therefore, the transmitter controller 333 causes the transmitter 50 to transmit the excess piece of the log information 32b exceeding the predetermined number in reverse chronological order of the time information to the server 2 at any time.

The storage controller 332 deletes from the buffer 342 the piece of the log information 32b transmitted to the server 2.

Figure 7:
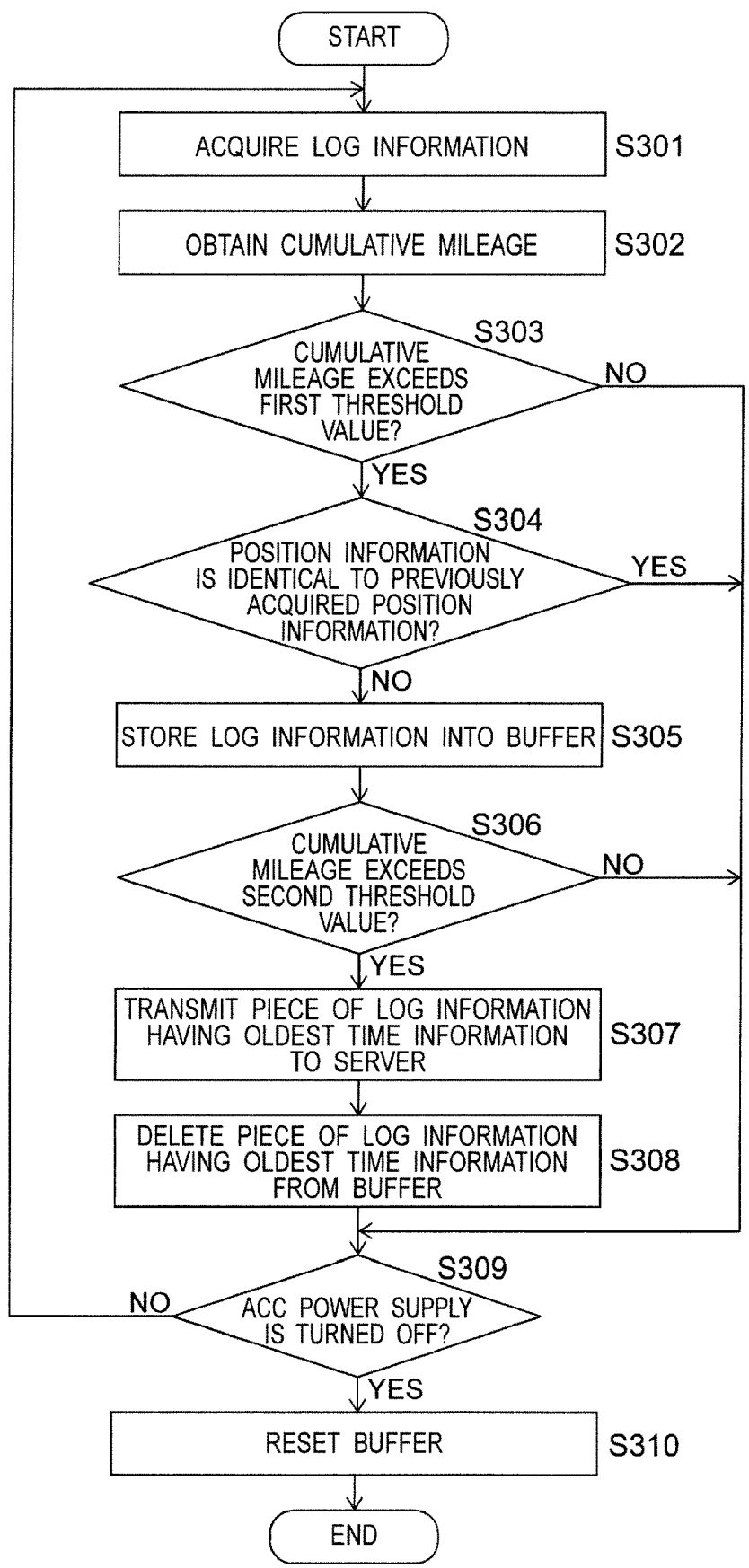
FIG. 7 is a flowchart showing a log information transmission process of the navigation apparatus according to the third embodiment.

Processes of the navigation apparatus 301 of this embodiment will hereinafter specifically be described. FIG. 7 is a flowchart showing a log information transmission process in the navigation apparatus 301 of this embodiment. This flowchart is started with the ACC power supply of the automobile switched on.

The processes of steps S301 to S304 are the same as the processes of steps S1 to S4 executed in the navigation apparatus 1 of the first embodiment.

At step S305, the storage controller 32 causes the buffer 342 to store the log information acquired by the log information acquisition portion 20 at step S301.

The process of step S306 is the same as the process of step S6 executed by the navigation apparatus 1 of the first embodiment.

At step S307, the transmitter controller 333 causes the transmitter 50 to transmit to the server 2 the piece of the log information 32b having the oldest time information in the log information stored in the buffer 342.

At step S308, the storage controller 32 deletes from the buffer 342 the piece of the log information 32b having the oldest time information transmitted to the server 2 at step S307.

The process of step S309 is the same as the process of step S9 executed by the navigation apparatus 1 of the first embodiment.

At step S310, the buffer 342 is reset. This is because the ACC power supply is switched off and the power supply to the buffer 342 is stopped. As a result, all the log information stored in the buffer 342 is deleted. Completing these processes, the navigation apparatus 301 terminates the log information transmission process.

As described above, the transmitter controller 333 causes the transmitter 50 to transmit an excess piece of the log information 32b to the server 2 each time the excess piece of the log information 32b is generated. Therefore, the navigation apparatus 301 can transmit the log information 32b to the server 2 in real time. The log information 32b collected in the server 2 in real time can suitably be used for traffic information, for example.

Figure 8:
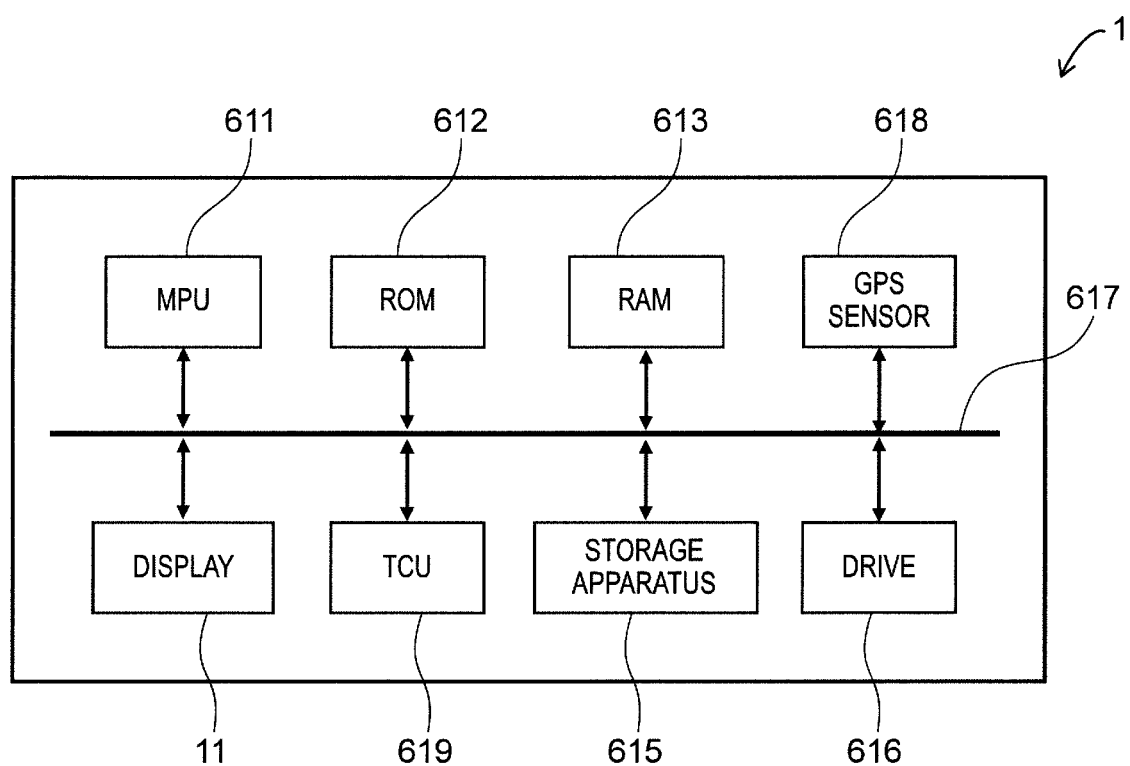
FIG. 8 is a block diagram showing an example of a hardware configuration of the navigation apparatus according to the first embodiment.

FIG. 8 is a block diagram showing an exemplary hardware configuration of the navigation apparatus 1 according to the first embodiment. The hardware configuration of the navigation apparatus 201 according to the second embodiment and the hardware configuration of the navigation apparatus 301 according to the third embodiment are the same as the hardware configuration of the navigation apparatus 1 according to the first embodiment.

The navigation apparatus 1 includes an MPU 611, a ROM (read only memory) 612, a RAM (random access memory) 613, a GPS sensor 618, a display 11, a TCU 619, a storage apparatus 615, and a drive 616.

The MPU 611 functions as an arithmetic processing apparatus and a control apparatus. The MPU 611 controls the general operation of the navigation apparatus 1 in accordance with various programs.

The ROM 612 stores programs, arithmetic parameters, etc. used by the MPU 611.

The RAM 613 temporarily stores a program used with the MPU 611 providing control. The RAM 613 temporarily stores parameters etc. changing as appropriate with the MPU 611 providing control.

The GPS sensor 618 receives a signal from a GPS satellite and measures the latitude and longitude of the automobile on which the navigation apparatus 1 is mounted. The navigation apparatus 1 may further include at least one of the vehicle speed sensor, the gyro sensor, and the acceleration sensor in addition to the GPS sensor 618.

The TCU 619 transmits the log information to the server 2. The TCU 619 receives the information transmitted from the server 2.

The storage apparatus 615 is implemented by a magnetic storage apparatus, a semiconductor storage apparatus, an optical storage apparatus, or a magneto-optical storage apparatus, for example. The magnetic storage apparatus is an HDD (hard disk drive), for example. The storage apparatus 615 stores a program executed by the MPU 611, various data thereof, various data acquired from the outside, etc.

The drive 616 is a reader/writer for a storage medium. The drive 616 reads information from a removable storage medium mounted on the navigation apparatus 1. Examples of the removable storage medium include a magnetic disk, an optical disk, a magneto-optical disk, an SD (Secure Digital) card, and a semiconductor memory. The drive 616 outputs the information read from the removable storage medium to the RAM 613.

The MPU 611, the ROM 612, the RAM 613, the GPS sensor 618, the display 11, the TCU 619, the storage apparatus 615, and the drive 616 are mutually connected by a bus 617.

For example, with a program of the present invention stored in the SD card, the program read from the SD card by the drive 616 is output to the RAM 613. The MPU 611 provides various controls based on the program output to the RAM 613. Specifically, the MPU 611 causes the GPS sensor 618 to receive signals from a GPS satellite at predetermined time intervals. The MPU 611 then stores the log information including the position information and the time information into the RAM 613. The position information and the time information are information acquired based on the signals received by the GPS sensor 618. The log information may be stored in the ROM 612. The MPU 611 causes the TCU 619 to transmit the log information to the server 2. The log information to be transmitted to the server 2 is an excess piece of the log information exceeding the predetermined number in reverse chronological order of the time information in the log information stored in the RAM 613. In the process described above, the programs and arithmetic parameters stored in the ROM 612 are appropriately used. In the process described above, programs and various data etc. stored in the storage apparatus 615 are appropriately used.

Although the embodiments of the present invention have been described, the apparatus configuration, the control method, etc. are not limited to the embodiments described above.

For example, in the first to third embodiments, the first buffer 42 and the buffer 342 are volatile memories; however, the present invention is not limited to this configuration. The first buffer 42 and the buffer 342 may be nonvolatile memories. In the case of this configuration, the storage controllers 32, 332 are configured to delete all the log information from the first buffer 42 with the ACC power supply of the automobile switched off.

In the first embodiment, even after the log information acquired in a situation where the cumulative mileage exceeds the second threshold value is stored in the first buffer 42, it is determined for a newly acquired piece of the log information whether the mileage exceeds each of the first threshold value and the second threshold value; however, the present invention is not limited to this configuration. For example, after the log information acquired in a situation where the cumulative mileage exceeds the second threshold value is stored in the first buffer 42, whether the mileage exceeds the first threshold value may not be determined for a newly acquired piece of the log information. Alternatively, after the log information acquired in a situation where the cumulative mileage exceeds the second threshold value is stored in the first buffer 42, whether the mileage exceeds the second threshold value may not be determined for a newly acquired piece of the log information.

The cumulative mileage is used as the amount of progress in the first embodiment, and the cumulative elapsed time is used as the amount of progress in the second embodiment; however, the present invention is not limited to this configuration. For example, the cumulative mileage and the cumulative elapsed time may selectively be used as the amount of progress. In this case, for example, the cumulative mileage is used in case the departure place is on a general road, and the cumulative elapsed time is used in case the departure place is on an expressway. Since a place considered as personal information such as a user's home is unlikely to exist on an expressway, the first threshold value is set to a relatively small value in case the cumulative elapsed time is used. As a result, the log information is stored in the storages 40, 340 after a short time from the departure of the automobile, so that the log information can be transmitted to the server 2.

In the first to third embodiments, a piece of the log information having the amount of progress exceeding the first threshold value is stored from the log information into the storages 40, 340; however, the present invention is not limited to this configuration. For example, a piece of the log information having the amount of progress not exceeding the first threshold value may also be stored in the storages 40, 340. In the case of this configuration, a process or a control is performed to prevent the piece of the log information having the amount of progress not exceeding the first threshold value from being transmitted to the server 2.

In the first and second embodiments, the excess piece of the log information 32*b* is transmitted to the second buffer 43; however, the present invention is not limited to this configuration. For example, the second buffer 43 may not be disposed, and the excess piece of the log information 32*b* may be accumulated in the first buffer 42. In this case, with the ACC power supply of the automobile switched off, the excess piece of the log information 32*b* is transmitted from the first buffer 42 to the server 2.

In the first to third embodiments, the log information is deleted by the storage controllers 32, 332 from the storages 40, 340 at a predetermined timing; however, the present invention is not limited to this configuration. For example, the log information may be converted into any other data that cannot be transmitted to the server 2. Alternatively, the log information may be overwritten by newly acquired log information.

In the first to third embodiments, the moving body is an automobile; however, the present invention is not limited to this configuration. For example, the moving body may be a motorcycle, a bicycle, a wheelchair, a ship, an aircraft, a drone, etc. The moving body may be a person.

In the first to third embodiments, the information processing apparatus is the navigation apparatus 1; however, the present invention is not limited to this configuration. For example, the information processing apparatus may be a portable terminal such as a smartphone. In this case, the portable terminal may be attached to a motorcycle, and the portable terminal may acquire the log information of the motorcycle. Alternatively, a person may carry the portable terminal, and the portable terminal may acquire the log information on the movement of the person.

In the first to third embodiments, the navigation apparatuses 1, 201, 301 determine the log information acquired with the amount of progress from the departure place of the automobile exceeding a predetermined value, based on the amount of progress; however, the present invention is not limited to this configuration. For example, a distance away from the departure place may be obtained based on the position information of the automobile, and the log information acquired with the distance exceeding a predetermined value may be determined as the log information acquired with the amount of progress exceeding a predetermined value.

Various modifications for other configurations can be made without departing from the spirit of the present invention. The configurations of the embodiments and the modifications described above may be combined with each other.

What is claimed is:

1. An information processing apparatus comprising:
a storage configured to store each piece of the log information in chronological order, the log information being acquired by a sensor at predetermined time intervals and including position information of a moving body and time information indicating time at which the position information was acquired, the storage including a first buffer and a second buffer; and
a CPU configured to:
store the log information into the first buffer when an amount of progress from a departure place of the moving body exceeds a first predetermined value;
store part of the log information from the first buffer to the second buffer when the amount of progress from the departure place of the moving body exceeds a second predetermined value, different from the first predetermined value;
transmit said part of the log information stored in the second buffer of the storage from the storage to an external apparatus outside the moving body,
wherein said part of the log information to be stored from the first buffer to the second buffer is an excess piece of the log information exceeding a predetermined number in reverse chronological order of the time information among the log information stored in the first buffer, and is not a piece of the log information not exceeding the predetermined number in reverse chronological order of the time information among the log information stored in the first buffer.

2. The information processing apparatus according to claim 1, the amount of progress is a mileage of the moving body from the departure place and is obtained based on the log information, and the CPU is configured to store the log information acquired in a situation where the mileage exceeds the first predetermined value.

3. The information processing apparatus according to claim 2, wherein the CPU is configured to store the log information including the position information different from the position information previously acquired.

4. The information processing apparatus according to claim 1, wherein the amount of progress is an elapsed time from start of acquisition of the log information and is obtained based on the log information, and the CPU is configured to store the log information acquired in a situation where the elapsed time exceeds the first predetermined value.

5. The information processing apparatus according to claim 1, wherein the log information is deleted from the first buffer of the storage in a situation where an ACC power supply of the moving body is switched off.

6. The information processing apparatus according to claim 1, wherein the CPU is configured to transmit two or more pieces of the log information stored in the second buffer of the storage together to a server, is the server being the external apparatus, at a predetermined timing.

7. The information processing apparatus according to claim 6, wherein the predetermined timing is a timing in a situation where the ACC power supply of the moving body is switched off.

8. The information processing apparatus according to claim 1, wherein each time the excess piece of the log information is generated, the CPU is configured to transmit the excess piece of the log information from the second buffer of the storage to the server, the server being the external apparatus.

9. An information processing method comprising the steps of:
acquiring log information at predetermined time intervals, the log information including position information of a moving body and time information indicating a time when the position information was acquired;
storing the log information into a first buffer of a storage when an amount of progress from a departure place of the moving body exceeds a first predetermined value;
storing part of the log information from the first buffer to the second buffer of the storage when the amount of progress from the departure place of the moving body exceeds a second predetermined value, different from the first predetermined value; and
transmitting said part of the log information stored in the second buffer of the storage from the storage to an external apparatus outside the moving body,
wherein said part of the log information to be stored from the first buffer to the second buffer is an excess piece of the log information exceeding a predetermined number in reverse chronological order of the time information among the log information stored in the first buffer, and is not a piece of the log information not exceeding the predetermined number in reverse chronological order of the time information among the log information stored in the first buffer.

10. A non-transitory computer-readable recording medium storing a program causing a computer to execute the steps of:
acquiring log information at predetermined time intervals, the log information including position information of a moving body and time information indicating a time when the position information was acquired;
storing the log information into a first buffer of a storage when an amount of progress from a departure place of the moving body exceeds a first predetermined value;
storing part of the log information from the first buffer to the second buffer of the storage when the amount of progress from the departure place of the moving body exceeds a second predetermined value, different from the first predetermined value; and
transmitting said part of the log information stored in the second buffer of the storage from the storage to an external apparatus outside the moving body,
wherein said part of the log information to be stored from the first buffer to the second buffer is an excess piece of the log information exceeding a predetermined number in reverse chronological order of the time information among the log information stored in the first buffer, and is not a piece of the log information not exceeding the predetermined number in reverse chronological order of the time information among the log information stored in the first buffer.

11. The information processing apparatus according to claim 1, wherein the moving body is an automobile, the CPU is embedded in a navigation apparatus, the sensor includes a GPS sensor and a vehicles speed sensor, and the log information includes vehicle speed information based on information acquired by the vehicle speed sensor, and the position information including latitude information and longitude information of the automobile acquired by the GPS sensor, and
wherein the CPU is configured to process the log information in relation to the first buffer, the second buffer and the external apparatus in such a manner that the log information acquired at and around a destination is prevented from being automatically transmitted to the external apparatus, and the navigation apparatus can easily collect the log information in the external apparatus while protecting personal information.

\* \* \* \* \*